(12) United States Patent
Mangan et al.

(10) Patent No.: US 9,536,304 B2
(45) Date of Patent: Jan. 3, 2017

(54) DETERMINING PATHOGENS BASED ON AN IMAGE OF SOMATIC CELLS IN A FLUID SAMPLE

(71) Applicant: DAIRY QUALITY INC., Queensville (CA)

(72) Inventors: Steven L. Mangan, Gananoque (CA); Gary Jonas, Queensville (CA)

(73) Assignee: Dairy Quality Inc. (CA)

( * ) Notice: Subject to any disclaimer, the term of this patent is extended or adjusted under 35 U.S.C. 154(b) by 42 days.

(21) Appl. No.: 14/473,398

(22) Filed: Aug. 29, 2014

(65) Prior Publication Data

US 2015/0063652 A1    Mar. 5, 2015

Related U.S. Application Data

(60) Provisional application No. 61/872,258, filed on Aug. 30, 2013.

(51) Int. Cl.
  *G06K 9/00*  (2006.01)
  *G06T 7/00*  (2006.01)

(52) U.S. Cl.
  CPC ........... *G06T 7/0012* (2013.01); *G06K 9/0014* (2013.01); *G06T 2207/30024* (2013.01)

(58) Field of Classification Search
  CPC .......................... G06K 9/0014; G06T 7/0012
  See application file for complete search history.

(56) References Cited

U.S. PATENT DOCUMENTS

| | | | |
|---|---|---|---|
| 6,197,593 B1 * | 3/2001 | Deka .................. | G01N 33/5094 356/39 |
| 6,391,541 B1 | 5/2002 | Petersen et al. | |

(Continued)

FOREIGN PATENT DOCUMENTS

| | | | | |
|---|---|---|---|---|
| CA | 2519554 A1 * | 10/2004 | ......... | G06K 9/00127 |
| CN | 102819765 A * | 12/2012 | | |

(Continued)

OTHER PUBLICATIONS

International Search Report, Application No. PCT/CA2012/000549, mailed Jan. 23, 2013.

(Continued)

*Primary Examiner* — Utpal Shah
(74) *Attorney, Agent, or Firm* — McDonnell Boehnen Hulbert & Berghoff LLP

(57) ABSTRACT

A computer-implemented method of identifying a pathogen likely causing an increased somatic cell count in a sample of fluid is described. An image of the sample of fluid is received. Pixels in the image are parsed to identify pixels representing somatic cells. The identified pixels are analyzed to determine image parameters. The determined images parameters are compared with different sets of predefined pathogen parameters stored in memory to determine a match. Each of the sets of pathogen parameters represents a different one of a plurality of pathogens. The pathogen likely causing an increased somatic cell count is identified by the set of the pathogen parameters that matches the image parameters. A computer readable medium storing instructions to implement the method and a system configure to implement the method are also described.

15 Claims, 7 Drawing Sheets

(56) References Cited

U.S. PATENT DOCUMENTS

| | | | | |
|---|---|---|---|---|
| 6,546,123 | B1* | 4/2003 | McLaren | G01N 1/312 |
| | | | | 382/128 |
| 6,710,879 | B1* | 3/2004 | Hansen | G01N 15/1459 |
| | | | | 356/301 |
| 6,731,100 | B1* | 5/2004 | Hansen | G01N 15/1463 |
| | | | | 324/637 |
| 7,907,769 | B2 | 3/2011 | Sammak et al. | |
| 8,049,814 | B2 | 11/2011 | Leibler et al. | |
| 2007/0098596 | A1 | 5/2007 | Fries et al. | |
| 2009/0233329 | A1* | 9/2009 | Rodriguez | G01N 15/1463 |
| | | | | 435/39 |
| 2009/0319191 | A1* | 12/2009 | Rivas | G01N 33/5091 |
| | | | | 702/19 |
| 2010/0009431 | A1 | 1/2010 | Cho et al. | |
| 2010/0317094 | A1* | 12/2010 | Ricco | G01N 33/04 |
| | | | | 435/287.2 |
| 2011/0188782 | A1 | 8/2011 | Thompson et al. | |
| 2011/0234757 | A1* | 9/2011 | Zheng | G02B 21/36 |
| | | | | 348/46 |
| 2012/0009431 | A1 | 1/2012 | Kazeto | |
| 2012/0157160 | A1* | 6/2012 | Ozcan | G01N 21/6458 |
| | | | | 455/556.1 |
| 2012/0169863 | A1* | 7/2012 | Bachelet | G01N 15/1463 |
| | | | | 348/79 |
| 2013/0157351 | A1* | 6/2013 | Ozcan | G01N 21/6486 |
| | | | | 435/288.7 |
| 2013/0273524 | A1* | 10/2013 | Ehrenkranz | G01N 21/17 |
| | | | | 435/5 |
| 2014/0012104 | A1* | 1/2014 | Chen | A61B 5/1455 |
| | | | | 600/322 |
| 2014/0242612 | A1* | 8/2014 | Wang | G01N 33/54386 |
| | | | | 435/7.23 |
| 2014/0248638 | A1* | 9/2014 | Thiele | G01N 33/6863 |
| | | | | 435/7.21 |
| 2015/0177147 | A1* | 6/2015 | Mangan | G01N 33/04 |
| | | | | 250/432 R |

FOREIGN PATENT DOCUMENTS

| | | |
|---|---|---|
| EP | 778950 | 11/2001 |
| WO | 2006084472 | 8/2006 |

OTHER PUBLICATIONS

International Preliminary Report on Patentability, Application No. PCT/CA2012/000549, mailed Sep. 22, 2014.

Terry, "Medical connectivity—telemicroscopes and point-of-care diagnostics team up with smartphones," Telemedicine and e-health, vol. 17. No. 5., pp. 320-323, Jun. 1, 2011.

Chen et al, "The study of a handheld digital microscope for biomedical applications," Bioinformatics and Biomedical Engineering 2nd Conference, pp. 1543-1546, May 16, 2008.

Pierce, "Digital technologies jump start telemedicine," Techdirections, vol. 70, No. 7, pp. 26-28, Feb. 2011.

* cited by examiner

DETERMINING PATHOGENS BASED ON AN IMAGE OF SOMATIC CELLS IN A FLUID SAMPLE

CROSS-REFERENCE TO RELATED APPLICATION

This application claims the benefit of U.S. Provisional Patent Application Ser. No. 61/872,258 filed Aug. 30, 2013, the contents of which are fully incorporated herein by reference.

The present invention relates generally to systems and methods for automatically determining pathogens in a fluid sample, such as a milk sample, for example, and specifically to determining the pathogens based on an image of somatic cells in the fluid sample.

BACKGROUND

Somatic Cell Count (SCC) is a main indicator of milk quality. The majority of somatic cells are leukocytes (white blood cells) which typically become present in increasing numbers in milk as an immune response to a mastitis-causing pathogen. The SCC is quantified as the number of cells per milliliter (ml) of milk. In general terms, an SCC of 100,000 or less indicates an 'uninfected' cow, in which there is no significant production loss due to subclinical mastitis. An SCC between 100,000 and 300,000 indicates that the cow is likely infected with mastitis. An SCC of 300,000 or greater indicates that the cow is likely infected with significant pathogens.

Dairy farmers are financially rewarded for low herd SCCs and penalized for high herd SCCs as SCCs reflect the quality of the milk produced. Mastitis, which is implicated by high SCC can affect milk constituent parts, having implications for its keeping abilities, its taste and how well it can be made into other dairy products such as yoghurt or cheese. Milk contracts often define several SCC 'thresholds' and any respective bonus for attaining them. Milk with an SCC of more than 400,000 is deemed unfit for human consumption by the European Union.

Further, a lower SCC indicates better animal health, as somatic cells originate only from inside the cow's udder. SCC monitoring is important because as the number of somatic cells increases, milk yield is likely to fall, primarily due to the damage to milk-producing tissue in the udder caused by mastitis pathogens and the toxins they produce, particularly when epithelial cells are lost.

The SCC tends to reflect a response to contagious mastitis pathogens and also indicate the level of bacterial contamination from external sources, such as insufficient cleaning of the milking equipment or poor udder and teat preparation prior to milking, and can indicate a high level of environmental pathogens. However, the SCC does not determine or quantify the pathogens present in the milk.

Accordingly, it will be appreciated that determining the pathogens in the milk is a very important, yet costly and time consuming practice. It would be of great benefit to identify and quantify these pathogens as quickly and easily as possible.

SUMMARY

In accordance with as aspect of an embodiment there is provided a computer-implemented method of identifying a pathogen likely causing an increased somatic cell count in a sample of fluid, the method, implemented by a processor, comprising: receiving an image of the sample of fluid; parsing pixels in the image to identify pixels representing somatic cells; analysing the identified pixels to determine image parameters; comparing the determined images parameters with different sets of predefined pathogen parameters stored in memory to determine a match, each of the sets of pathogen parameters representing a different one of a plurality of pathogens; and identifying the pathogen likely causing an increased somatic cell count by the set of the pathogen parameters that matches the image parameters.

In accordance with another aspect of an embodiment there is provided a computer readable medium having stored thereon instruction which, when executed by a processor, cause the processor to: receive an image of the sample of fluid; parse pixels in the image to identify pixels representing somatic cells; analyse the identified pixels to determine image parameters; compare the determined images parameters with different sets of predefined pathogen parameters stored in memory to determine a match, each of the sets of pathogen parameters representing a different one of a plurality of pathogens; and identify the pathogen likely causing an increased somatic cell count by the set of the pathogen parameters that matches the image parameters.

In accordance with yet another aspect of an embodiment there is provided a system for identifying a pathogen likely causing an increased somatic cell count in a sample of fluid, the system comprising: a scope comprising: a viewing opening at one end of the scope; a slot proximate an end of the scope distal to the viewing opening, the slot configured to receive a slide comprising the sample of fluid; and a lens system configured to create a magnified image of at least a portion of the sample of fluid; a case configured to attach to the scope and configured to receive and support a computing device in a predefined position with respect to the scope; and a computing device comprising: a camera having configured to acquire an image of the sample of fluid; memory for storing instructions; and a processor configured to execute the instructions to: receive timage of the sample of fluid; parse pixels in the image to identify pixels representing somatic cells; analyse the identified pixels to determine image parameters; compare the determined images parameters with different sets of predefined pathogen parameters stored in memory to determine a match, each of the sets of pathogen parameters representing a different one of a plurality of pathogens; and identify the pathogen likely causing an increased somatic cell count by the set of the pathogen parameters that matches the image parameters.

As will be appreciate the device and method described herein provide a more efficient and cost-effective pathogen determination by allowing a dairy producer to determine the presence of pathogens on-site. This speedy diagnosis will, in some cases, reduce usage of incorrect antibiotics, increase use of the most effective antibiotics, and reduce the impact of antibiotic resistant strains. As a result, cure rates may improve, resulting in increased milk quality and overall cow health.

BRIEF DESCRIPTION OF THE DRAWINGS

Embodiments of the present invention will now be described by way of example only with reference to the following drawings which.

DETAILED DESCRIPTION OF THE INVENTION

Figure 1:
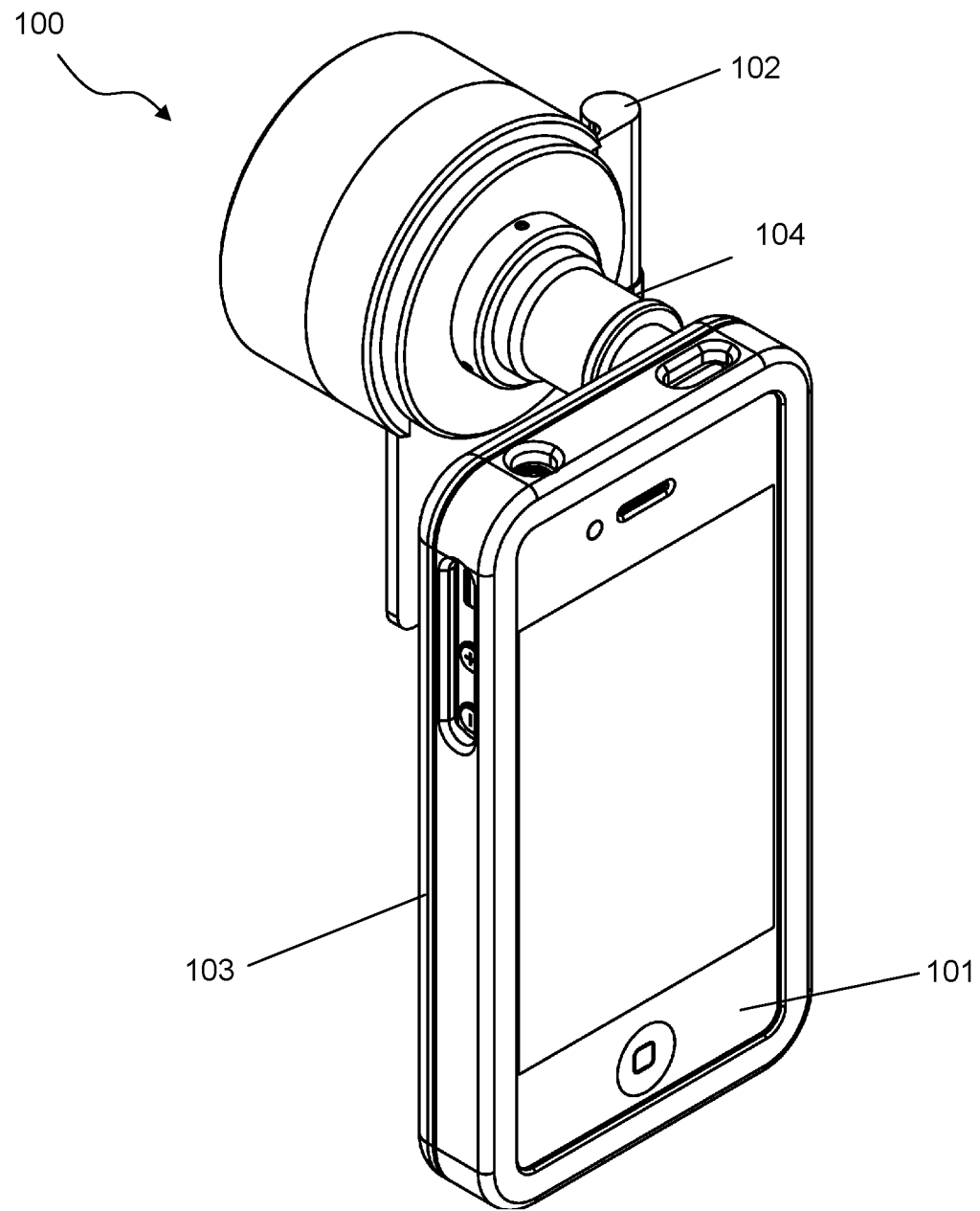
FIG. 1 is an isometric view of a smart phone attached to a biological fluid analysis system.

For convenience, like numerals in the description refer to like structures in the drawings. Referring to FIG. 1, a biological fluid analysis system accordance to an embodiment of the present invention is illustrated by numeral 100. The biological fluid analysis system is configured to enhance and amplify somatic cells in a sample of biological fluid and present an image to portable computing device 101 that has a camera. In the present embodiment, the portable computing device is a smart phone. The biological fluid analysis system includes a scope 104, a sample slide 102 and a case 103.

In the present embodiment, the portable computing device 101 is a smart phone. However, other examples that may be used as the portable computing device 101 include tablet computers, notebook computer or hybrids thereof, that include a camera with a lens for taking photographs, a display for displaying images and text to the user of the portable computing device 101, and a computer processor programmable by software. The software causes the computer processor to control the camera and process photographs, or images, taken by the camera. The portable computing device 101 also generally has an input user interface configured to allow the user to provide input, including text. Example of such an input interface include a physical keyboard, a touch screen, a gesture-based interface or an audio-based interface. Examples of such portable computing devices include, for example, an iPhone™, an iPad™, a Galaxy Nexus™, a BlackBerry Curve™, an HTC Rezound™ and the like. The portable computing device 101 includes software applications, or "apps", which are coded in a suitable language and compiled to produce executable software applications for running on the processor. The device may also have a wireless interface that allows it to communicate, and exchange data, with other computing devices over a phone network and/or the internet.

The portable computing device 101 is generally a widely available commercial off-the-shelf product and is low cost as compared to a custom-designed analyzer for analyzing photographic images. In general the portable computing device 101 includes an image sensor, such as a CCD sensor or a CMOS sensor, that produces an image having a predefined pixel resolution. Some examples of pixels resolutions include 640×480, 1280×1024, 1600×1200 or greater. As the technology advances, the resolution of the image of the portable computing device 101 continues to improve. In one embodiment, a 1280×1024 pixel image resolution for counting somatic cells in milk is used.

Figure 2:
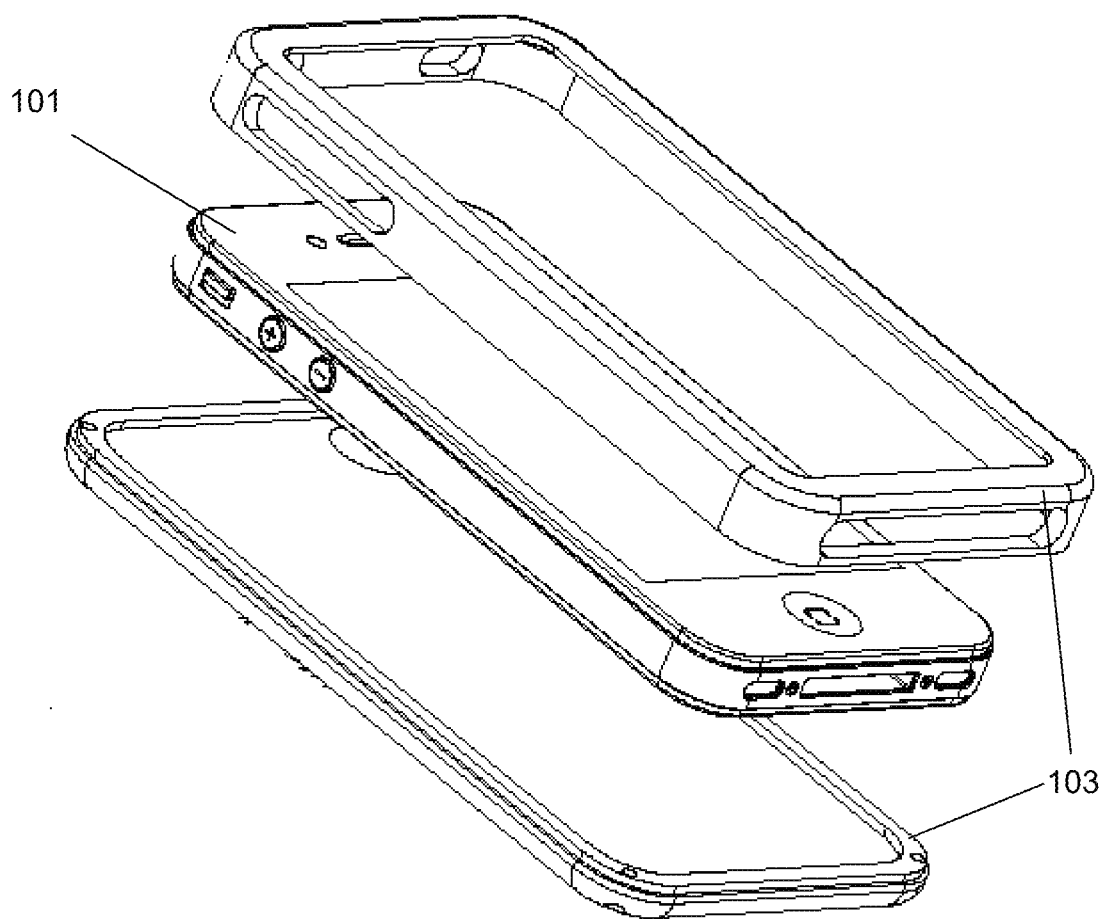
FIG. 2 is an exploded view of a case configured attach the smart phone to the biological fluid analysis system.
Figure 3:
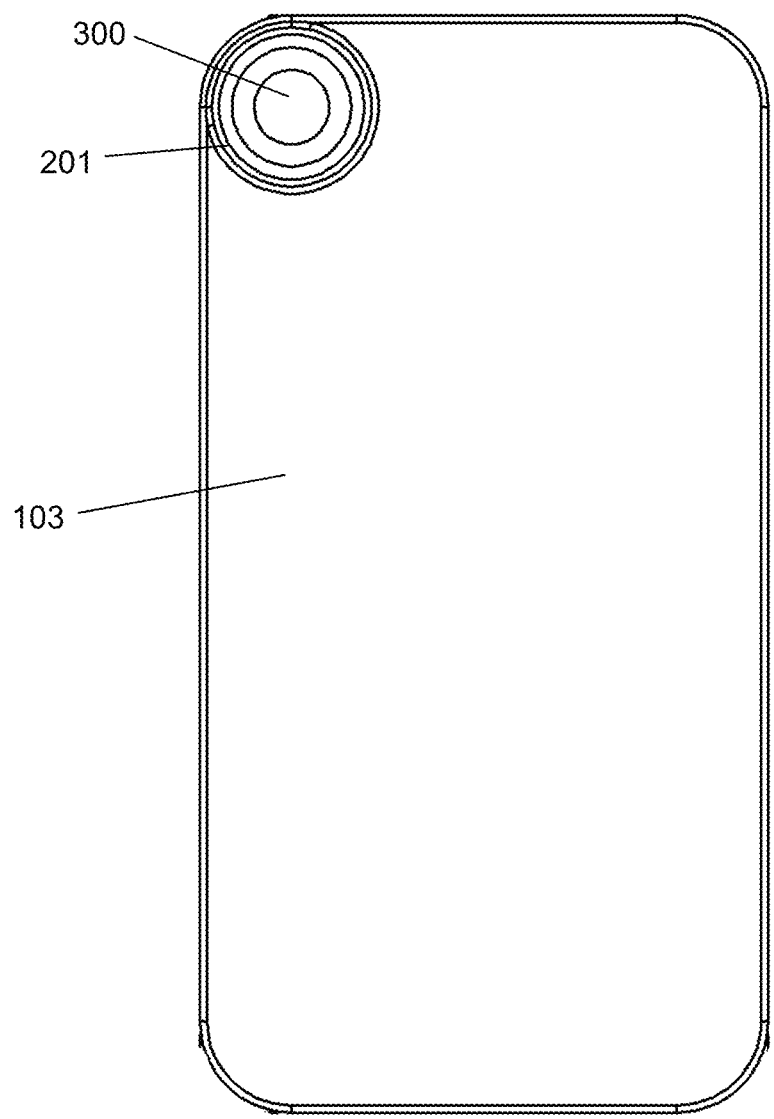
FIG. 3 is a rear plan view of the smart phone position within the case.

Referring to FIGS. 2 and 3, the case 103 is illustrated in greater detail. The case 103 is configured to couple the portable computing device 101 to the scope 104 so that the lens of the portable computing device 101 is positioned to receive the image presented by the scope 104, as will be described. In this embodiment, the case 103 is configured to fit a particular type or class of portable computing device. For example, one type of case 103 may be designed to fit an iPhone™ 4S smart phone. The case 103 is designed to connect firmly to the portable computing device 101 and has a lens opening 300 positioned to expose the camera lens when the case 103 is attached to the portable computing device 101. The lens opening 300 is preferably circular and, when the case 103 is attached to the device 101, the edge of the lens opening 300 surrounds the camera lens so that the lens is approximately centered in the opening 300.

Figure 4:
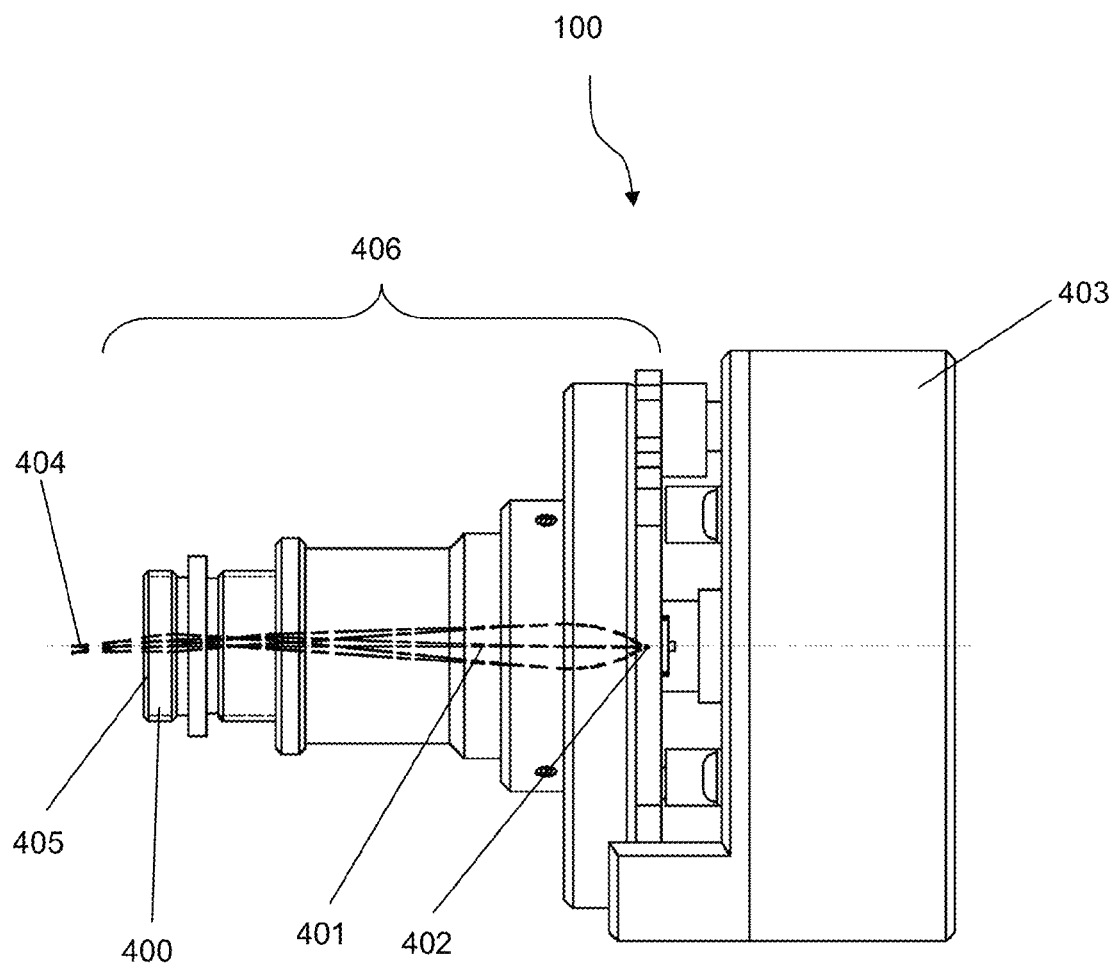
FIG. 4 is a side view of a scope of the biological fluid analysis system.
Figure 5:
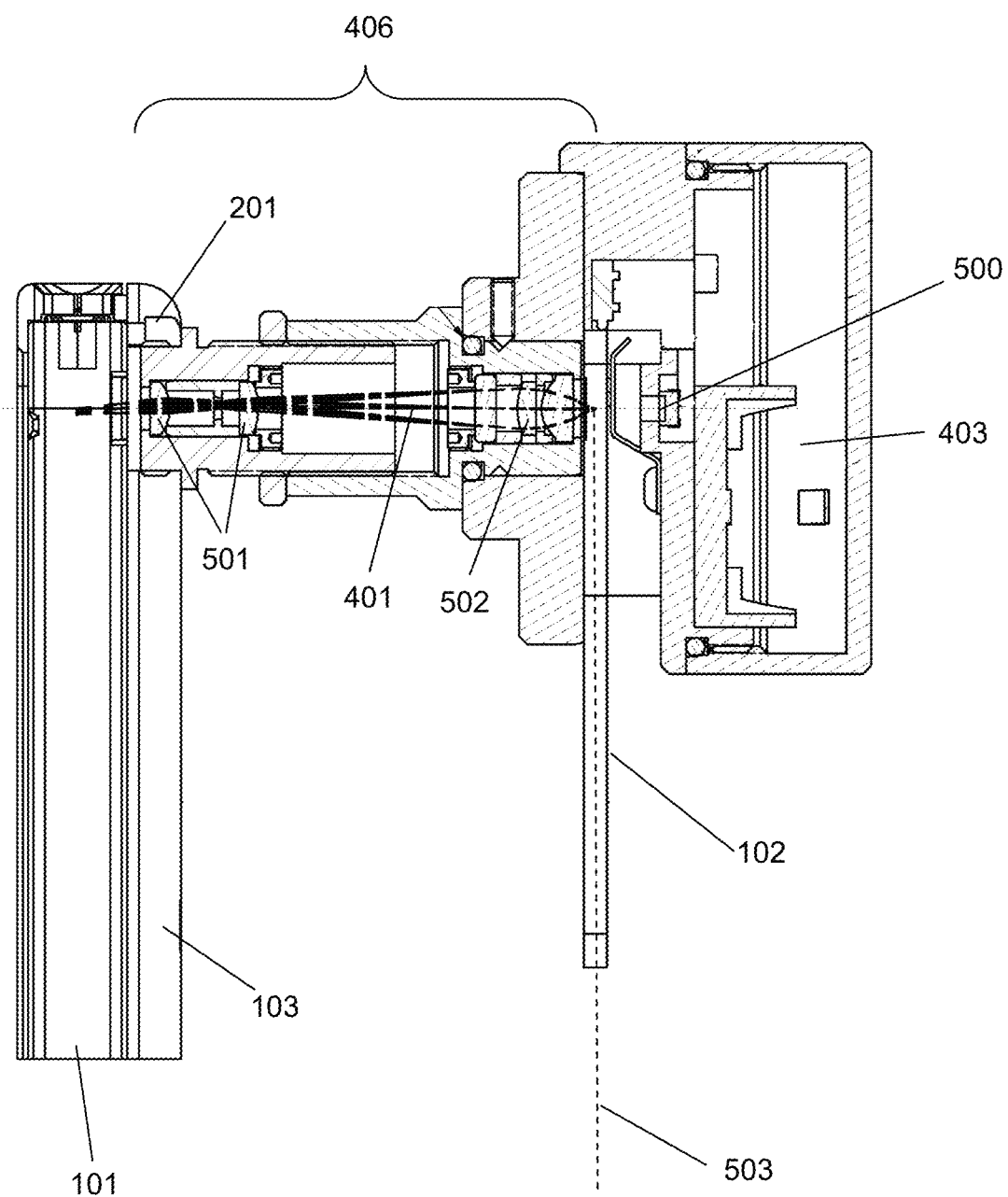
FIG. 5 is a cross-sectional side view of the smart phone and the biological fluid analysis system of FIG. 1.
Figure 7:
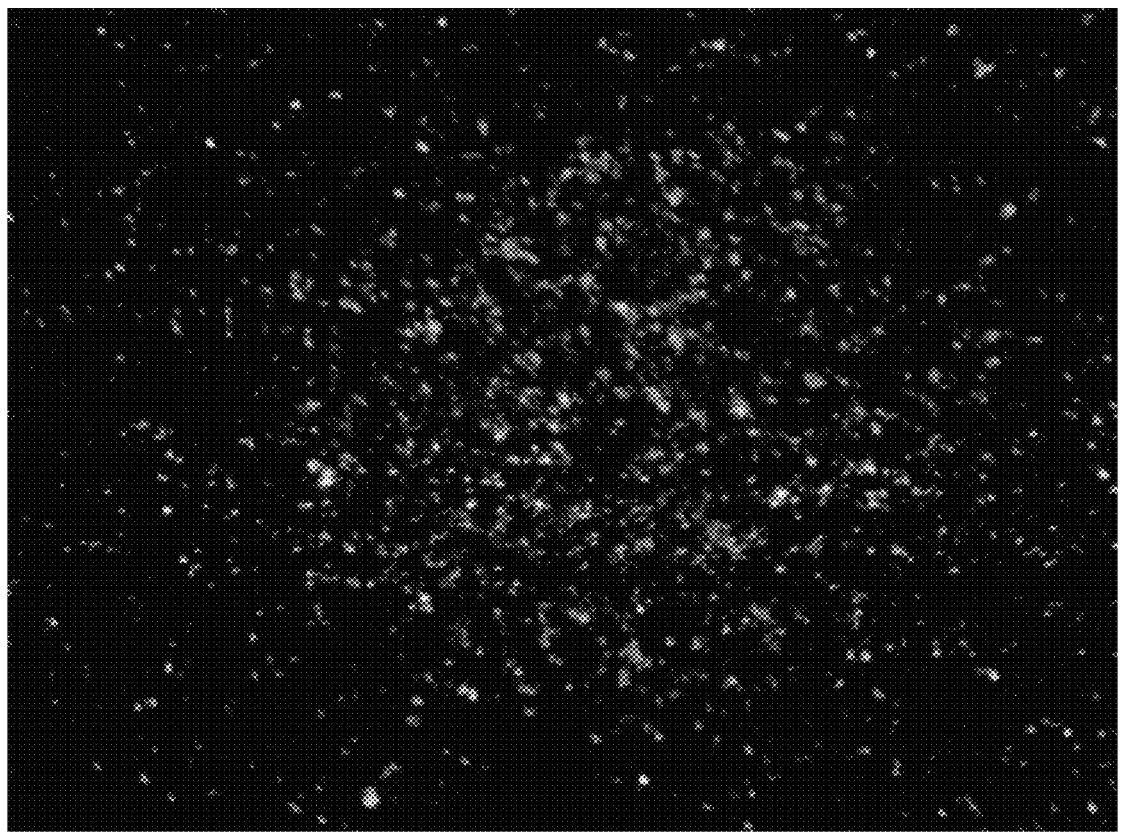
FIG. 7 is an image, visible using a smart phone camera, of a sample of fluid.

The case 103 includes a scope connector 201 that is designed to connect to, or mate with, a case connector 400 on the scope 100 to maintain the scope 100 in a fixed position relative to the portable computing device 101 so that the magnified image 404 at the viewing opening 405 at the proximal end of the imaging tube 406 is presented to the camera lens through the lens opening 300. A case connector 400 is shown in FIG. 4, and FIGS. 5 and 7 show a case connector 201 mated with a scope connector. In some embodiments, the scope connector 201 has a circular cross section in the plane parallel to the side (generally the back) of the device 101 having the camera lens, and is integrally formed with the edge of the lens opening 300 or surrounds the lens opening 300. For example, it may comprise a cylindrical section, having a central axis perpendicular to the back of the mobile device 101 and the camera lens, that provides either a threaded connector or a bayonet mount similar to the types of connectors employed by Singele-Lens Reflex (SLR) camera bodies for use in mounting lenses. However, any type of scope connector that permits the scope 100 to be rigidly connected to the case 103 so that the magnified image 404 produced by the scope 100 is presented to the camera lens may be employed. Other than the scope mount 201 and lens opening 300, the case 103 may be generally similar to commercially available off-the-shelf mobile device cases that typically surround the entire phone other than the camera lens or lenses, display, keyboard (if any), and microphone, speaker and other openings. It does not need to have two parts as depicted in FIG. 2, and may be a single piece into which the device 101 is placed or slid into. However any case is suitable that is adapted to provide a stable scope mount 201 so that the magnified image 404 produced by the scope 100 is presented to the camera lens when the scope 100 is attached to the case 103.

FIG. 4 shows a side view of the scope 104 of FIG. 1 in isolation. The scope 104 comprises a rear portion 403 that may house a power source, such as a battery, and an imaging tube 406 defining a light path 401 between the viewing chamber 402 and a viewing opening 405 in the proximal end of the imaging tube 406. Towards the distal end, the imaging tube 406 has a slot, which may be oriented perpendicularly with respect to the light path, for insertion of a sample slide having a viewing chamber 402 so that the viewing chamber 402 of the sample slide may be positioned at the focal plane 503 (shown in FIG. 5) of the objective lens 502 of the scope 104.

The light path 401 runs along the central longitudinal axis of the imaging tube 406 in the centre of the imaging tube 406. The imaging tube 406 may be cylindrical, with varying diameter as shown in FIG. 4 to accommodate the lens system housed therein comprising cylindrical lenses, and defines the light path 401 by its central longitudinal axis.

When the sample in the viewing chamber 402 is illuminated, light reflected from the sample or transmitted by the sample along the light path may be magnified by the lens system disposed within the imaging tube 406 to create a magnified image 404 of a portion of the sample of biological fluid at (near) the viewing opening 405 so that the magnified image 404 is presented to the camera lens of the mobile device 101 when a case is attached to the device 101 and the scope 100 is attached to the case. In the embodiment shown in FIG. 4, the case connector 400 is formed from a portion of the cylindrical imaging tube 406, near the proximal end of the imaging tube 406, having threads on the outside for mating with a threaded scope connector 201.

The scope 104, to facilitate counting somatic cells in milk, is adapted to be able to resolve circular objects of 1-10 microns in diameter with a field size of at least 100 microns. This may require magnifying the sample by about 400 times. The length of the scope 100 may be about 75 mm or less. As noted when discussing the portable computing device 101, a 1280×1024 pixel image resolution is used. Accordingly, a scope providing 200-400× magnification of the sample will provide about a five micron resolution. The magnification is selected to provide sufficient resolution in the resulting photograph so that somatic cells can be resolved and their size measured by analyzing the photograph.

FIG. 5 is a cross section of the biological fluid analysis system 100 of FIG. 1 through the longitudinal axis of the imaging tube 406 along which the light path 401 passes, with a slide 102 inserted in the scope 104, and the scope 104 connected to a case 103 housing smart phone 101. The scope 104 may include a light source 500 that may be placed behind the position of the viewing chamber 402 when it is positioned in the slide slot of the scope 104. FIG. 5 shows a slide 102 inserted in the slot in the scope 104 so that the viewing chamber is placed in the focal plane 503 of the scope between the light source 500 and an objective lens 502 disposed within the imaging tube 406. There is also an ocular lens, or lens system, 501 disposed within the imaging tube 406 near the proximal end that causes a magnified image 404 to be formed from light passing through the viewing chamber 402 and through the objective lens 502 positioned between the viewing chamber 402 and the ocular lens.

A filter is disposed within the imaging tube 406 so that the light path passes through the filter to select which wavelengths are employed in the formation of the image 404.

In an embodiment, the system is adapted to analyze cow's milk to estimate the number of somatic cells per unit volume contained in the milk (the SCC). Such analysis is widely used to assess the health of cattle and the quality of their milk. This may be done using a reagent that is mixed with a milk sample and stains the somatic cells contained in the sample, which cells may be referred to as target cells, so that they will fluoresce when excited by light with a particular wavelength, or within a particular range of wavelengths. Accordingly, the light source in the scope then is adapted to generate light of that particular wavelength, or within that particular range of wavelengths. The reagent used may be propidium iodide, for which the particular wavelength is preferably in the range of about 500 nm to 570 nm, and more preferably about 535 nm. This results in fluorescence emission from the stained cells in the range of about 575 nm to 700 nm (mostly red), centered at about 617 nm. The stained target cells thereby are optically distinct from the remainder of the biological fluid, having a much greater brightness in the magnified image than the remainder of the sample in the red plane, or alternatively in a grayscale photograph captured by the camera. In this embodiment, the scope 104 is designed with a filter to allow the fluoresced light to pass through the filter, but not the light generated by the light source. For example, the filter may be configured to passes light in the range of 575 nm to 700 nm.

Figure 6:
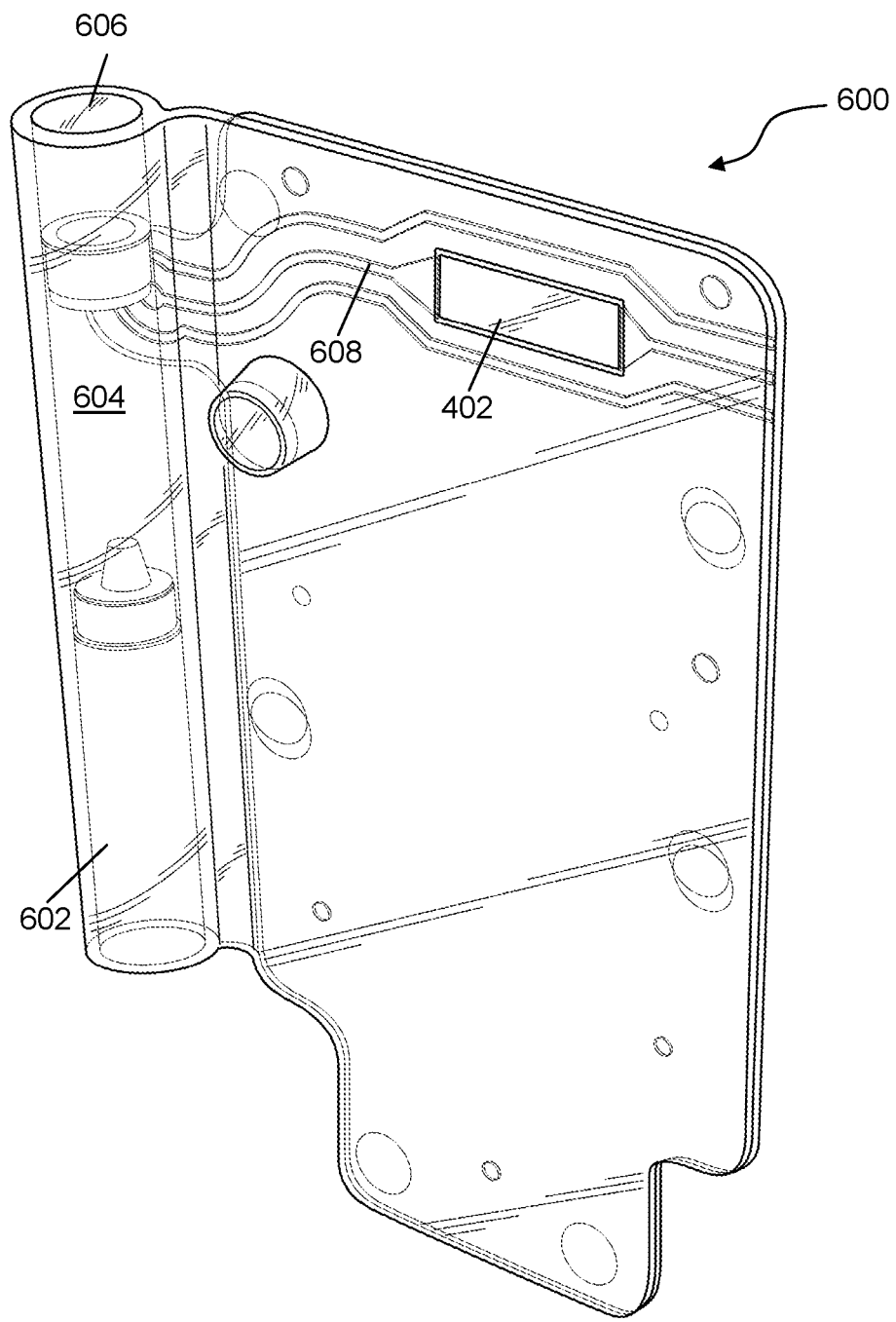
FIG. 6 is a perspective view of a sample slide.

Referring to FIG. 6, a sample slide is illustrated generally by numeral 600. The sample slide 600 includes a reservoir 602, a mixing chamber 604, a fluid inlet 606, a viewing chamber 402, and a conduit 608. The mixing chamber 604 is in fluid communication with the reservoir 602 and the fluid inlet 606. Further, the conduit 608 provides fluid communication between the mixing chamber 604 and the viewing chamber 402. The reservoir 602 is configured to hold a predefined amount of the reagent. As will be appreciated, a sample of the fluid to be analyzed is inserted into the mixing chamber 604 via the fluid inlet 606. The reagent is released from the reservoir 602 and mixed with the fluid in the mixing chamber 604. The mixed fluid travels to the viewing chamber 402 via the conduit 608.

Referring to FIG. 7, an image of a sample of fluid taken visible using the lens of the smart phone is illustrated. In this embodiment, the image is visible using a camera application that is native to the smart phone. A custom application may also be installed on the smart phone that has access to the lens, either directly or via the native camera application. Optionally, the native camera application may be used to capture the image and then provide the captured image to the custom application. The custom application is configured to analyze the magnified image of the sample of fluid in order to determine at least one optical characteristic of the sample. In the case of cow's milk stained with propidium iodide, the custom application is a SCC application and the optical characteristic of the sample that is measured by the system is an estimate of the total number of somatic cells in the image. The estimate of total number of somatic cells can then be converted to an estimate of the number of somatic cells per unit volume of the sample based on the volume of the sample represented in the image, which is known from the interior depth of the viewing chamber (i.e. the interior width of the chamber along the light path) and the area of the viewing chamber represented by the magnified image.

As illustrated in FIG. 7, pixels that are part of a somatic cell are generally brighter than pixels not associated with a somatic cell. For a given configuration, a somatic cell threshold can be determined so that pixels with a brightness value greater than or equal to the somatic cell threshold are considered to be part of a cell ("cell pixels"), and pixels with a brightness value less than the somatic cell threshold are not considered to be part of a cell ("non-cell pixels"). One example of the somatic cell threshold is a red pixel value greater than 120. For example, a thresholding operation can be applied to the image to set all cell pixels to the value 1, and all non-cell pixels to the value 0. A connected region in the resulting binary image (a connected region being a group of cell pixels such that each cell pixel in the connected region is adjacent to at least one other cell pixel in the connected region) then represents a somatic cell or a number of overlapping or adjacent somatic cells. Such connected regions are also often referred to as connected components or blobs.

The SCC application employs algorithms to identify connected regions and to identify the perimeters of the connected regions in an image are well known. Connected regions may have "holes", being connected groups of one or more non-cell pixels such that no members of the group are connected to other non-cell pixels outside of the perimeter of the connected region.

In a simple embodiment, the SCC application may find and count the number of cell pixels in the perimeter of each connected region in turn, removing each connected region from the image after it has been found and the perimeter identified and counted. The cell count is initially set to zero.

Based on historical analysis of visually inspected samples, a minimum perimeter length can be established so that any connected regions with a perimeter less than the minimum are not counted. Otherwise, the connected region is counted as a cell, and the cell count is incremented by one. After all regions have been analyzed, the resulting cell count provides an estimate of the number of somatic cells in the sample. The SCC application then further extrapolates the number of somatic cells per unit volume of biological fluid based on an estimate of the volume of milk imaged in the magnified image.

Also based on historical analysis of visually inspected samples, a second minimum perimeter length can be established so that any connected regions with a perimeter greater than the second minimum length are identified as macrophage cells and a second count of the number of macrophage cells may be made. Such a count may be more directly relevant to the assessment of the presence of mastitis than the count of all somatic cells. This is based on the fact that macrophage cells are known to be larger than other types of somatic cells normally found in a milk sample.

Alternatively, the somatic cell count may be estimated by calculating the total area of all connected regions in the image having an area or perimeter greater than a pre-defined minimum value. This total can then be divided by an estimate of the average number of cell pixels for a somatic cell, which number can be determined by calibrating the number so that the somatic cell count thereby calculated equals the cell count estimated by visual inspection, or other high-resolution method, on average over a reasonable number of samples (such as at least 100 samples).

Rather than using a thresholding algorithm, a more sophisticated algorithm may be used in order to achieve more accurate results. For example, segmentation may be performed directly on grayscale pixel values using a watershed algorithm.

Further, in addition to estimating the somatic cell count, the SCC application can be used to provide a diagnosis of the pathogen causing the somatic cells in the milk. In an embodiment, the pathogen diagnosis is performed automatically when the estimate of the number of somatic cells in the milk exceeds a predefined diagnosis threshold. The diagnosis threshold indicates that there is mastitis in the cow that produced the milk sample. An example of the diagnosis threshold is 100,000/ml, but may vary in the range of 100,000/ml to 300,000/ml depending on the implementation.

As noted above, and illustrated in FIG. 7, the image of the milk sample includes a number of connected regions that include overlapping or adjacent pixels of varying degrees of brightness. This results in an image that includes more information than traditional, laboratory-based SCC devices, which provide a binary output of "white" for a pixel associated with a somatic cell and "black" for all other pixels. This additional information can be used by the SCC application for pathogen diagnosis, as will be described.

As previously discussed, a pixel having a brightness greater than the somatic cell threshold is determined to represent at least part of a somatic cell. Image parameters associated with these pixels are determined. Example of image parameters include brightness, number of pixels within a connected region, number of connected regions within the sample and the like. Once the image parameters have been determined, they are compared with different sets of pathogen parameters to determine a match. Each of the sets of pathogen parameters includes characteristics representing a different pathogen. The pathogen associated with the pathogen parameters that match the image parameters is selected as the likely pathogen causing the increased somatic cell count.

Thus, for example, when *Streptococcus Agalactiae* is present in the milk sample, the somatic cells appear in the image as a specific range of small defined dots. The SCC application determines the size and number of connected regions. For example, if there are between 300 and 800 evenly distributed connected regions, then the pathogen is likely *Streptococcus Agalactiae*.

In another example, when *Staphylococcus Aureus* is present in the milk sample, the somatic cells appear in the image as large clusters throughout. Thus, if there are no more than seven connection regions, each larger than five pixels in diameter, ragged in shape and pixel brightness greater than 200, then the pathogen is likely *Staphylococcus Aureus*.

In another example, when Mycoplasma is present in the milk sample, the somatic cells appear in the image as extremely large connected regions. Thus, if there are no more than seven connection regions, each larger than five pixels in diameter with a pixel brightness in the range of 140 to 180, then the pathogen is likely Mycoplasma.

As will be appreciated a number of different pathogens can be defined by their pathogen parameters and compared with the image of the milk sample.

Once the SCC application has selected the pathogen based on the method described above, the pathogen is identified on a display of the portable computing device 101. Early analysis of the SCC application indicates a 95 percent true positive test rate and a five percent false negative test rate. Such results would be a dramatic improvement on culture sampling traditionally used for pathogen analysis.

Generally, a computer, computer system, computing device, client or server, as will be well understood by a person skilled in the art, includes one or more computer processors, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network. When they are relatively close together the network may be a local area network (LAN), for example, using Ethernet. When they are remotely located, the network may be a wide area network (WAN), such as the internet, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.). Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to the processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell the invention or parts thereof.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention as will be evident to those skilled in the art.

Where, in this document, a list of items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the items, and alternatives to the items, in the list that a skilled person would understand would be suitable for the purpose that the items are listed.

The word "transparent" as used herein with respect to the viewing chamber means that a significant proportion of light reflected from or transmitted by the sample in the viewing chamber passes though the surface of the viewing chamber at the end of the light path. In preferred embodiments, the portion of the slide covering the chamber on the side facing the imaging tube is clear glass or plastic so that 90% or more of the light passes through the slide. In embodiments that are backlighted, such as the embodiment depicted in FIG. 5, both the front and back sides of the viewing chamber are transparent. "Translucent" has the same meaning as "transparent" herein.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A computer-implemented method of identifying a pathogen likely causing an increased somatic cell count in a sample of fluid, the method, implemented by a processor, comprising:
   receiving an image of the sample of fluid;
   parsing pixels in the image to identify pixels representing somatic cells;
   analysing the identified pixels to determine image parameters;
   comparing the determined image parameters with different sets of predefined pathogen parameters stored in memory to determine a match, each of the sets of pathogen parameters representing known image parameters of somatic cells associated with a different one of a plurality of pathogens; and
   identifying the pathogen likely causing the increased somatic cell count by the set of the pathogen parameters that matches the determined image parameters.

2. The method of claim 1, wherein the fluid is milk.

3. The method of claim 2, further comprising determining a somatic cell count of the number of somatic cells identified in image and only performing the analysing, comparing and identifying if the somatic cell count exceeds a predefined diagnosis threshold.

4. The method of claim 2, wherein the image parameters include at least one of pixel brightness, a number of pixels within a connected region, a number of connected regions, a size of the connected region, a shape of the connected region, or a distribution of the connected regions.

5. The method of claim 2, further comprising presenting an identification of the pathogen on a display.

6. A non-transitory computer readable medium having stored thereon instruction which, when executed by a processor, cause the processor to:
   receive an image of the sample of fluid;
   parse pixels in the image to identify pixels representing somatic cells;
   analyse the identified pixels to determine image parameters;
   compare the determined image parameters with different sets of predefined pathogen parameters stored in memory to determine a match, each of the sets of pathogen parameters representing known image parameters of somatic cells associated with a different one of a plurality of pathogens; and identify the pathogen likely causing the increased somatic cell count by the set of the pathogen parameters that matches the determined image parameters.

7. The computer readable medium of claim 6, wherein the fluid is milk.

8. The computer readable medium of claim 7, comprising further instruction that causes the processor to determine a somatic cell count of the number of somatic cells identified in image and only perform the analysing, comparing and identifying if the somatic cell count exceeds a predefined diagnosis threshold.

9. The computer readable medium of claim 7, wherein the image parameters include at least one of pixel brightness, a number of pixels within a connected region, a number of connected regions, a size of the connected region, a shape of the connected region, or a distribution of the connected regions.

10. The computer readable medium of claim 7, comprising further instruction that causes the processor to present an identification of the pathogen on a display.

11. A system for identifying a pathogen likely causing an increased somatic cell count in a sample of fluid, the system comprising:
    a scope comprising:
        a viewing opening at one end of the scope;
        a slot proximate an end of the scope distal to the viewing opening, the slot configured to receive a slide comprising the sample of fluid; and
        a lens system configured to create a magnified image of at least a portion of the sample of fluid;
    a case configured to attach to the scope and configured to receive and support a computing device in a predefined position with respect to the scope; and
    a computing device comprising:
        a camera having configured to acquire an image of the sample of fluid;
        memory for storing instructions; and
        a processor configured to execute the instructions to:
            receive the image of the sample of fluid;
            parse pixels in the image to identify pixels representing somatic cells;
            analyse the identified pixels to determine image parameters;
            compare the determined image parameters with different sets of predefined pathogen parameters stored in memory to determine a match, each of the sets of pathogen parameters representing known image parameters of somatic cells associated with a different one of a plurality of pathogens; and
            identify the pathogen likely causing the increased somatic cell count by the set of the pathogen parameters that matches the determined image parameters.

12. The system claim 11, wherein the fluid is milk.

13. The system of claim 12, wherein the computing device comprises further instruction that causes the processor to determine a somatic cell count of the number of somatic cells identified in image and only perform the analysing, comparing and identifying if the somatic cell count exceeds a predefined diagnosis threshold.

14. The system of claim 12, wherein the image parameters include at least one of pixel brightness, a number of pixels within a connected region, a number of connected regions, a size of the connected region, a shape of the connected region, or a distribution of the connected regions.

15. The system of claim 12, wherein the computing device comprises further instruction that causes the processor to present an identification of the pathogen on a display of the computing device.

\* \* \* \* \*